(12) United States Patent
Lin et al.

(10) Patent No.: US 7,034,888 B2
(45) Date of Patent: Apr. 25, 2006

(54) METHOD FOR MOTION PIXEL DETECTION (75) Inventors: Wen-Kuo Lin, Taipei (TW);
Chung-Yen Lu, Taipei (TW)

(73) Assignee: Silicon Integrated Systems Corp.,
Hsin Chu (TW)

( * ) Notice: Subject to any disclaimer, the term of this patent is extended or adjusted under 35 U.S.C. 154(b) by 562 days.

(21) Appl. No.: 10/396,781

(22) Filed: Mar. 26, 2003

(65) Prior Publication Data

US 2004/0189866 A1 Sep. 30, 2004

(51) Int. Cl.
*H04N 7/01* (2006.01)

(52) U.S. Cl. .................................... 348/452; 348/441

(58) Field of Classification Search ................ 348/441, 348/448, 451, 452, 458, 459, 616, 620, 699, 348/700; H04N 7/01, 11/20, 5/21
See application file for complete search history.

(56) References Cited

U.S. PATENT DOCUMENTS 6,940,557 B1 *  9/2005  Handjojo et al. ........... 348/452
2002/0171759 A1 * 11/2002  Handjojo et al. ........... 348/452

* cited by examiner

*Primary Examiner*—Sherrie Hsia
(74) *Attorney, Agent, or Firm*—Troxell Law Office, PLLC (57) ABSTRACT

A method for motion pixel detection with a static counter map so as to correctly evaluate whether a missing pixel is in a static region or a non-static region, thereby reconstructing the missing pixel by an inter-field interpolation process or an intra-field interpolation process, respectively.

19 Claims, 8 Drawing Sheets

METHOD FOR MOTION PIXEL DETECTION

BACKGROUND OF THE INVENTION

1. Field of the Invention

The present invention generally relates to a method for motion pixels detection and, more particularly, to a method for motion pixels detection with a static counter map so as to correctly evaluate whether a missing pixel is in a static region or in a non-static region, thereby reconstructing the missing pixel by an inter-field interpolation process or an intra-field interpolation process, respectively.

2. Description of the Prior Art

In the prior art, a motion-adaptive algorithm is used to reconstruct a missing pixel based on whether the missing pixel locates in a static region or a non-static region. More particularly, if the missing pixel is evaluated to locate in a static region, an inter-field interpolation process is exploited to reconstruct the missing pixel by referring to the information in the neighboring fields; on the other hand, if the missing pixel is evaluated to locate in a non-static region, then intra-field interpolation process is employed to reconstruct the missing pixel by referring to the information in the neighboring original scan lines of the same field.

Figure 1A:
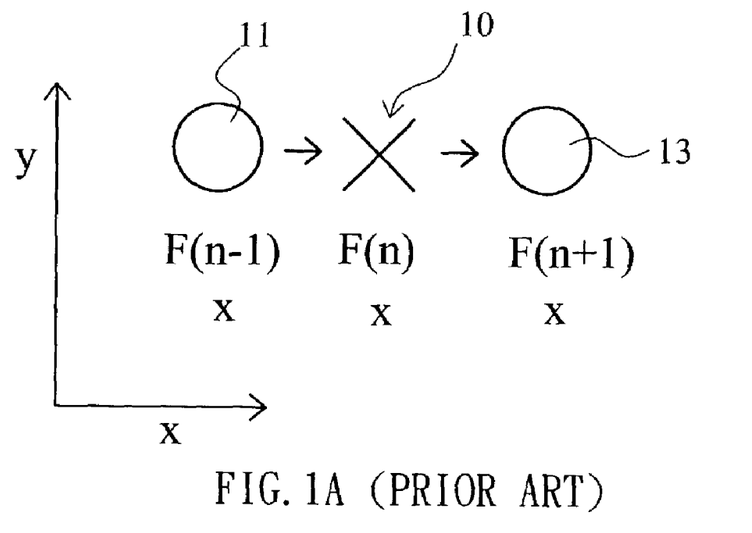
FIG. 1A is a schematic diagram showing an inter-field interpolation process in the prior art.

Please refer to FIG. 1A, which is a schematic diagram showing an inter-field interpolation process in the prior art. As shown in FIG. 1A, a missing pixel 10 denoted by the "X" symbol is to be interpolated and is in the field F(n), while the preceding pixel 11 and the next pixel 13 are both denoted as "O" and are the original pixels in the fields F(n−1) and F(n+1), respectively. The coordinates of these three pixels are expressed as (x,y). The missing pixel 10 and the neighboring pixels 11 and 13 are at different time instance. Therefore, in the inter-field interpolation process, the missing pixel 10 is reconstructed by averaging the value of pixel 11 and the value of pixel 13, that is:

$$X = \frac{[F(x, y, n-1) + F(x, y, n+1)]}{2} \quad \text{(EQ. 1)}$$

wherein F(x,y,n−1) is the expression for the preceding pixel 11 and F(x,y,n+1) is the expression for the next pixel 13.

Figure 1B:
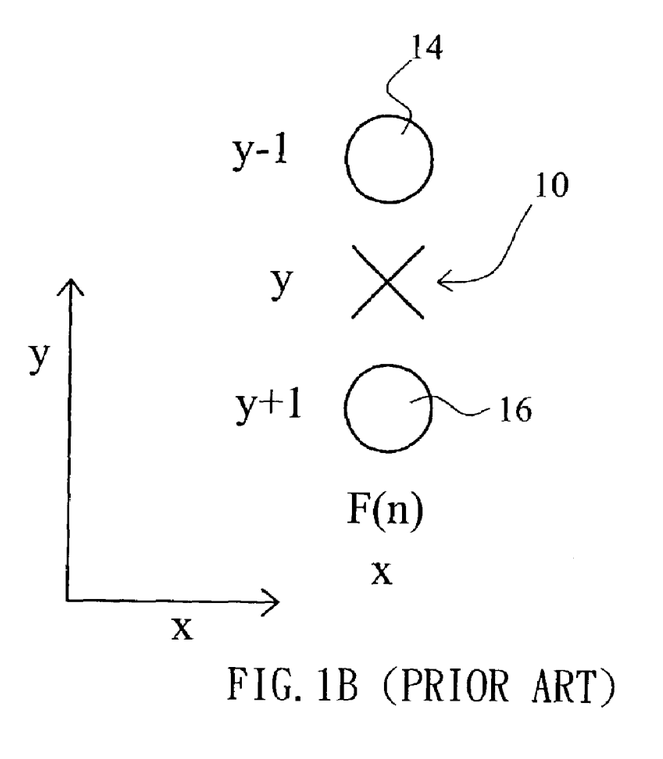
FIG. 1B is a schematic diagram showing an intra-field interpolation process in the prior art.

Please further refer to FIG. 1B, which is a schematic diagram showing an intra-field interpolation process in the prior art. As shown in FIG. 1B, a missing pixel 10 denoted by the "X" symbol is to be interpolated and is in the field F(n), while the first pixel 14 and the second pixel 16 are both denoted as "O" and are the original pixels in the same field F(n). The coordinates of the first pixel 14, the missing pixel 10 and the second pixel 16 are expressed as (x,y−1), (x,y), and (x,y+1), respectively. The missing pixel 10, the first pixel 14 and the second pixel 16 are at different locations in the y-orientation. Therefore, in the intra-field interpolation process the missing pixel 10 is reconstructed by averaging the value of pixel 14 and the value of pixel 16, that is:

$$X = \frac{[F(x, y-1, n) + F(x, y+1, n)]}{2} \quad \text{(EQ. 2)}$$

wherein F(x,y−1,n) is the expression for the first pixel 14 and F(x,y+1,n) is the expression for the second pixel 16.

To evaluate whether the missing pixel 10 locates in a static region or in a non-static region, the difference of the surrounding regions in the neighboring fields is calculated. If the difference is smaller than a threshold, the region surrounding the missing pixel 10 is recognized as a static region, implying the missing pixel 10 is in a static region. Whereas, if the difference is larger than the threshold, the region surrounding the missing pixel 10 is recognized as a non-static region, implying the missing pixel 10 is in a non-static region.

Figure 2:
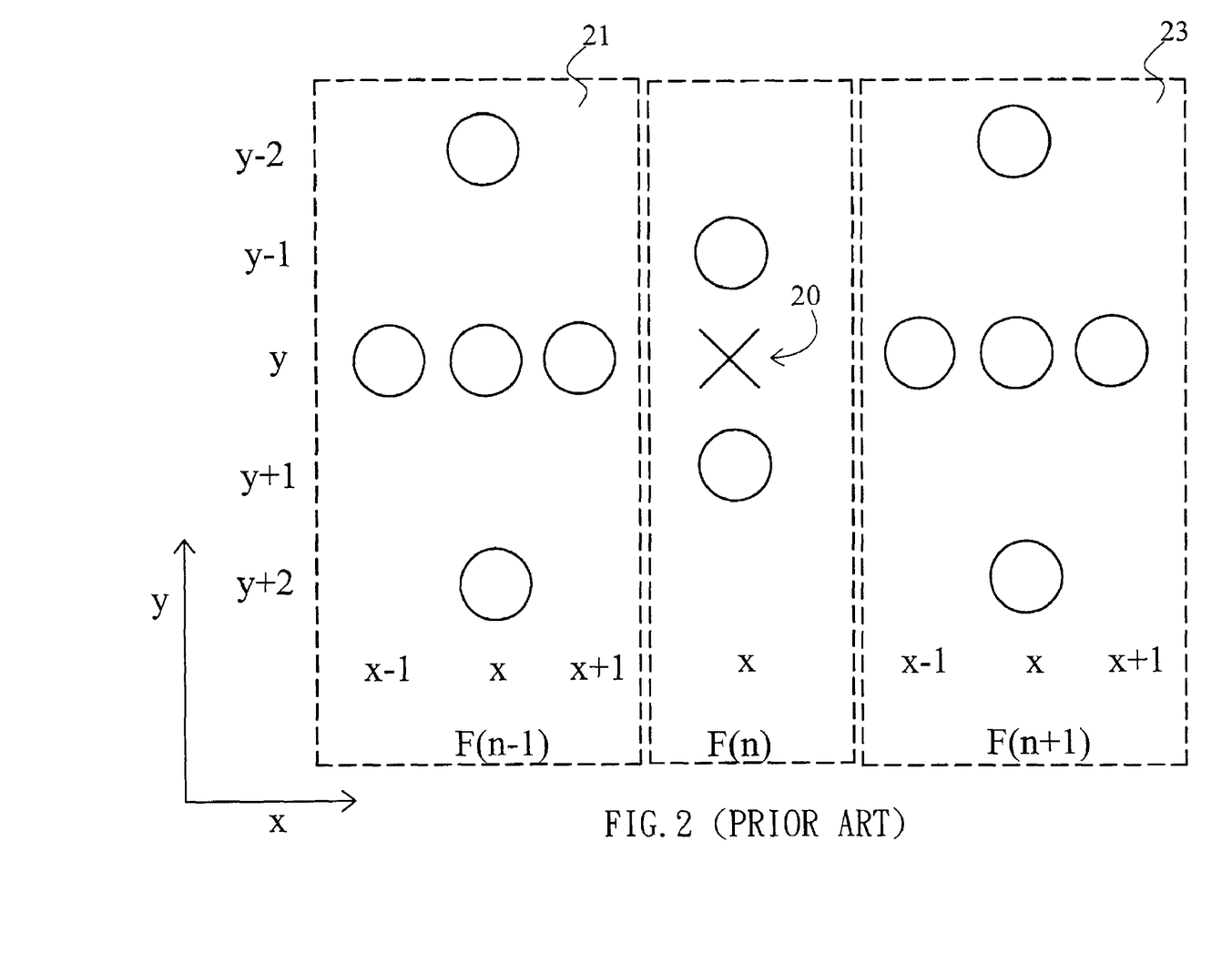
FIG. 2 is a schematic diagram showing the pixels referred conventionally in calculating the sum of absolute difference (SAD) in the prior art.

To calculate the difference between the surrounding regions in the neighboring fields, a conventional method referred to as the sum of absolute difference (SAD) is employed. Please refer to FIG. 2, which is a schematic diagram showing the conventional method. As shown in FIG. 2, a missing pixel 20, denoted by the "X" symbol, is to be interpolated and is in the field F(n), while a plurality of neighboring pixels, denoted as "O", are original pixels in the fields F(n−1) 21 and F(n+1) 23. Therefore, the missing pixel 20 can be reconstructed by employing the inter-field interpolation process as shown in FIG. 1A and the intra-field interpolation process as shown in FIG. 1B. More particularly, the region difference "Diff(x,y,n)" is given by:

$$Diff(x, y, n) = \sum_{(i,j) \in \Gamma} |f(i, j, n-1) - f(i, j, n+1)| \quad \text{(EQ. 3)}$$

where f(.) denotes the original pixels and $$\Gamma = \{(x,y-2), (x,y), (x,y+2), (x-1,y), (x+1,y)\}.$$

It is noted that $\Sigma |f(i,j,n-1)-f(i,j,n+1)|$ is the sum of absolute difference between the original pixels in the fields F(n−1) 21 and F(n+1) 23. More particularly, f(i,j,n−1) denotes the pixels in the field F(n−1) 21, while f(i,j,n+1) denotes the pixels in the field F(n+1) 23. Furthermore, (i,j) represents the locations of the pixels at the coordinates of (x,y−2), (x,y), (x,y+2), (x−1,y), and (x+1,y).

Figure 3:
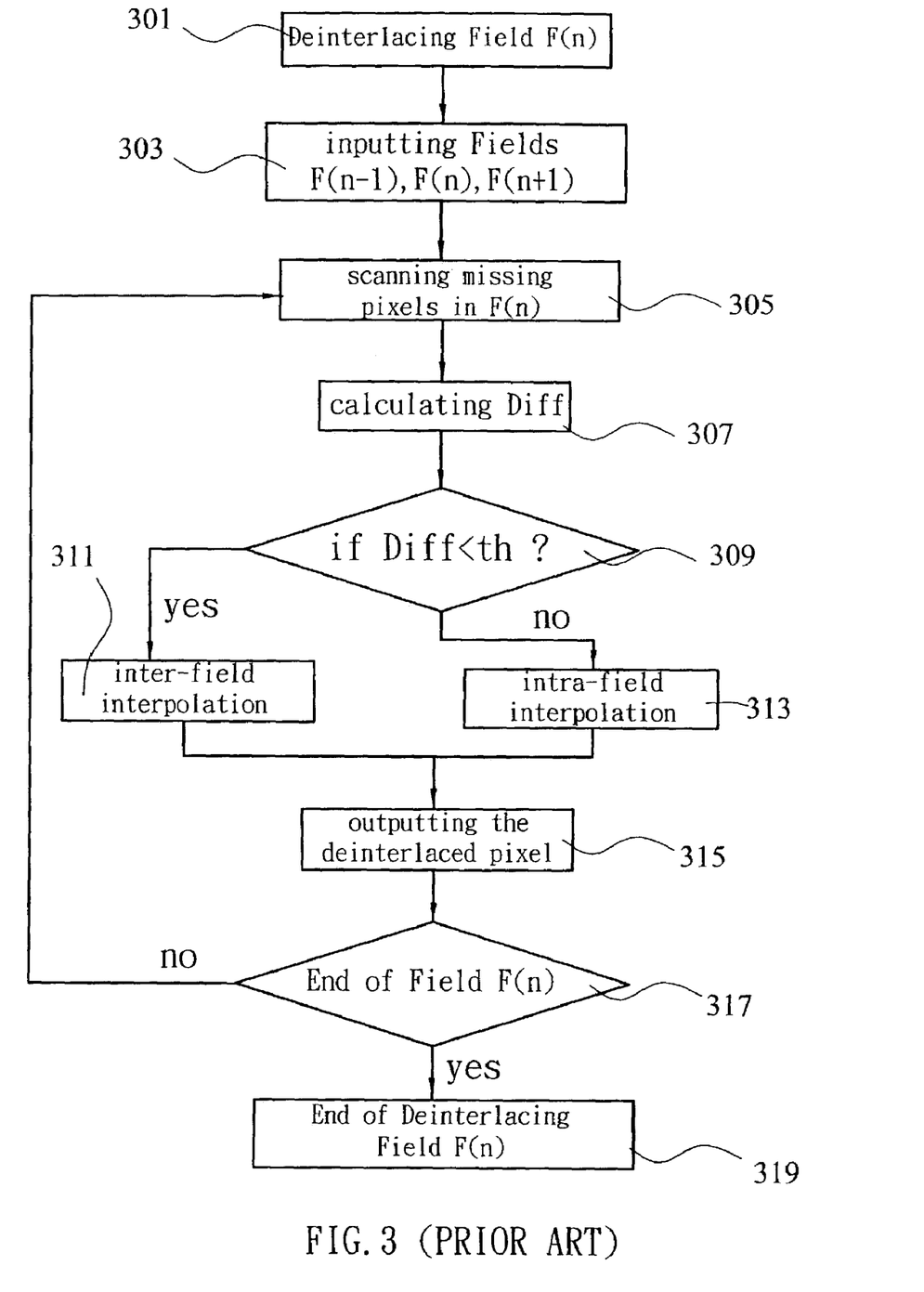
FIG. 3 is a flow chart showing a motion-adaptive de-interlacing algorithm in the prior art.

The related art of the motion-adaptive de-interlacing algorithm is presented by a flow chart shown in FIG. 3. To begin with, field F(n) is to be de-interlaced (step 301). A de-interlacing processor inputs the current field F(n), the preceding field F(n−1), and the next field F(n+1) (step 303). After that, the missing pixels in field F(n) is scanned and interpolated in the raster order, from top-left to bottom-right (step 305). In order to evaluate whether the region surrounding a missing pixel is a static region or not, the region difference Diff is calculated (step 307) and then compared with a threshold (step 309). If the difference Diff is smaller than the threshold, the missing pixel is reconstructed by using the inter-field interpolation process as discussed with reference to FIG. 1A (step 311); otherwise, if the difference Diff is larger than or equal to the threshold, then the missing pixel is reconstructed by using the intra-field interpolation process as discussed with reference to FIG. 1B (step 313). After that, the de-interlaced pixel is output (step 315) and whether the pixel scanning process has reached the end of field F(n) is evaluated (step 317). If yes, the de-interlacing process on field F(n) is stopped (step 319); otherwise, the procedure returns to step 305 and these static region detection and interpolation processes repeat until all the missing pixels in field F(n) have been reconstructed.

Even though the afore-mentioned motion-adaptive de-interlacing algorithm is easy to implement, the evaluation of a static region or a non-static region using only one field difference may only reflect the localized motion information to that region. This may, in turn, lead to a wrong evaluation if the region contains fast motion or motion blur. In other words, the difference between regions in the two neighboring fields that contain fast motion or motion blur may be smaller than the threshold. Consequently, the inter-field interpolation process would introduce errors to the pixels being de-interlaced. If the errors occur in one or two pixels, the errors might be hardly perceivable. However, if the errors occur in a group of pixels, then the errors would be very noticeable.

Therefore, there is a need to provide a method for motion pixel detection with a static counter map so as to correctly evaluate whether a missing pixel is in a static region or in a non-static region.

SUMMARY OF THE INVENTION

The primary objective of the present invention is to provide a method for detecting motion pixels with a static counter map so as to correctly evaluate whether missing pixels in an interlaced video field are in static regions or in non-static regions, thereby reconstructing the missing pixels by an inter-field interpolation process or an intra-field interpolation process, respectively.

In order to demonstrate the foregoing objective of the present invention, the present invention is implemented into a motion-adaptive de-interlacing algorithm comprising the following steps: de-interlacing a video field; inputting said field being de-interlaced, the preceding field and the next field; scanning said missing pixel and performing interpolation in a raster order; calculating a difference among the pixels surrounding said missing pixel; comparing said difference with a threshold; increasing a static counter by 1 if said difference is smaller than said threshold; otherwise, reconstructing said missing pixel by using an intra-field interpolation process if said difference is larger than or equal to said threshold; outputting a reconstructed de-interlaced pixel; evaluating whether the end of said field is reached; and returning to scanning said missing pixel if yes; otherwise stopping de-interlacing said field if not.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention provides a method for motion pixels detection with a static counter map that can be exemplified by the preferred embodiments as described hereinafter.

Figure 4:
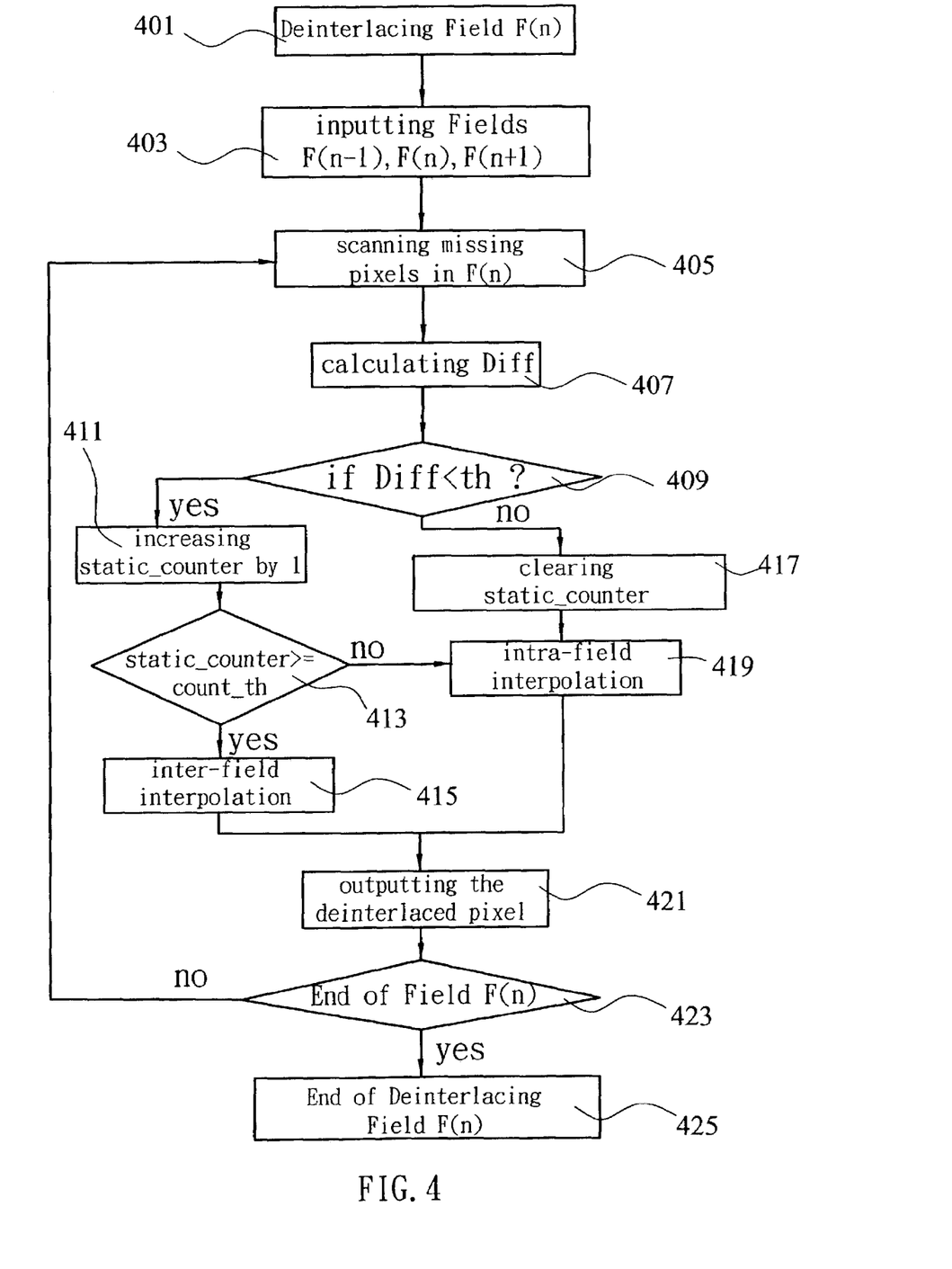
FIG. 4 is a flow chart showing a motion-adaptive de-interlacing algorithm with a static counter map in accordance with one preferred embodiment of the present invention.

To start with, please refer to FIG. 4, which is a flow chart showing a motion-adaptive de-interlacing algorithm with a static counter map in accordance with one preferred embodiment of the present invention. The present invention is based on the presumption that the static regions are most likely to occur at the same location in a video field. In FIG. 4, field F(n) is to be de-interlaced (step 401). A de-interlacing processor inputs the current field F(n) and a plurality of reference fields including the preceding field F(n−1), and the next field F(n+1) (step 403). After that, the missing pixels in the field F(n) is scanned and interpolated in the raster order, from top-left to bottom-right (step 405), the mentioned missing pixels are those pixels discarded in frame-to-field conversion for current video field being de-interlaced.

In order to evaluate whether the region surrounding the missing pixel is a static region or a non-static region, a difference Diff is calculated (step 407) by using $$\mathit{Diff}(x, y, n) = \sum_{(i,j) \in \Gamma} |f(i, j, n-1) - f(i, j, n+1)|.$$

After that, the value of each static counter at the spatial position corresponding to each missing pixel is modified according to the result of difference comparison. Then, to reconstruct each of missing pixels by either using an inter-field interpolation process or an intra-field interpolation process is determined by the value of the corresponding static counter. To do this, the difference Diff calculated is compared with a threshold (step 409) to evaluate whether the missing pixel is in a static region or in a non-static region. If the difference Diff is smaller than the threshold, the region where the missing pixel locates is a static region, and therefore a static counter value static_counter is increased by 1 (step 411). The static counter value static_counter is then compared with a pre-determined count threshold count_th (step 413). If the static counter value static_counter is smaller than the count threshold count_th, the missing pixel is still reconstructed using an intra-field interpolation process (step 419). On the other hand, if the static counter value static_counter is larger than or equal to the count threshold count_th, the missing pixel is reconstructed by using an inter-field interpolation process (step 415).

However, if the difference Diff is larger than or equal to the threshold, the region where the missing pixel locates contains motion, and therefore the static counter value static_counter is cleared to zero (step 417) and the missing pixel is reconstructed using the intra-field interpolation process (step 419). After that, outputting the reconstructed de-interlaced missing pixel to the interlaced video field(step 421) and whether the scanning process has reached the end of the interlaced video field F(n) is evaluated (step 423). If yes, the field F(n) is stopped being de-interlaced (step 425); otherwise, the procedure returns to step 405 and these static region detection and interpolation processes repeat until all the missing pixels in the field F(n) have been reconstructed.

Figure 5A:
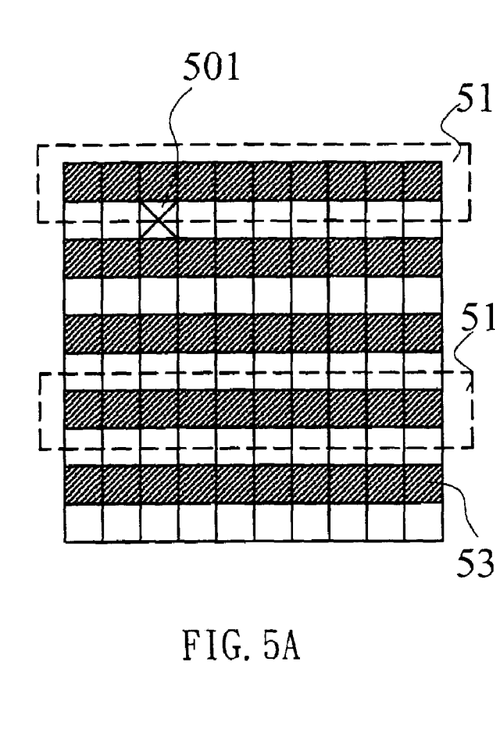
FIG. 5A shows a conceptual top video field with one of the missing pixels marked by 'X'.
Figure 5B:
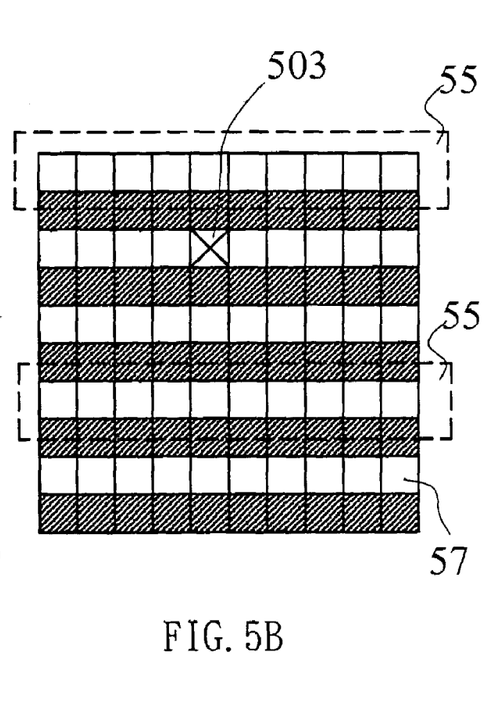
FIG. 5B shows a conceptual bottom video field with one of the missing pixels marked by 'X'.
Figure 5C:
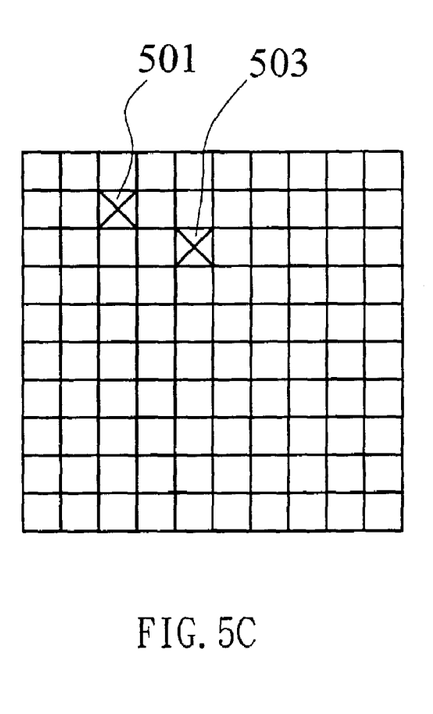
FIG. 5C shows a conceptual static counter map with two counters corresponding to two pixel positions marked by 'X'.

In FIG. 5A to FIG. 5C, the usage of a static counter map is illustrated. In the figures, an interlaced video frame is divided into one top field and one bottom field, as shown in FIG. 5A and FIG. 5B, respectively. The dark stripes in both fields represent the original scan lines 51 and the dark squares represent the original pixels 53, while the white stripes represent the missing scan lines 55 and the white blocks represent the missing pixels 57. The static counter map is the same size as the original video frame and each square on the static counter map is a static counter for the missing pixel at that spatial location. For brevity, the 'X' symbol(501) in FIG. 5A denotes one of the missing pixels in the top field, and the 'X' symbol(503) in FIG. 5B denotes one of the missing pixels in the bottom field. FIG. 5C shows a static counter map in accordance with one preferred embodiment of the present invention. The static counters corresponding to the same spatial locations of the first missing pixel 501 in FIG. 5A and the second missing pixel 503 in FIG. 5B are marked as "X" on the static counter map.

Figure 6:
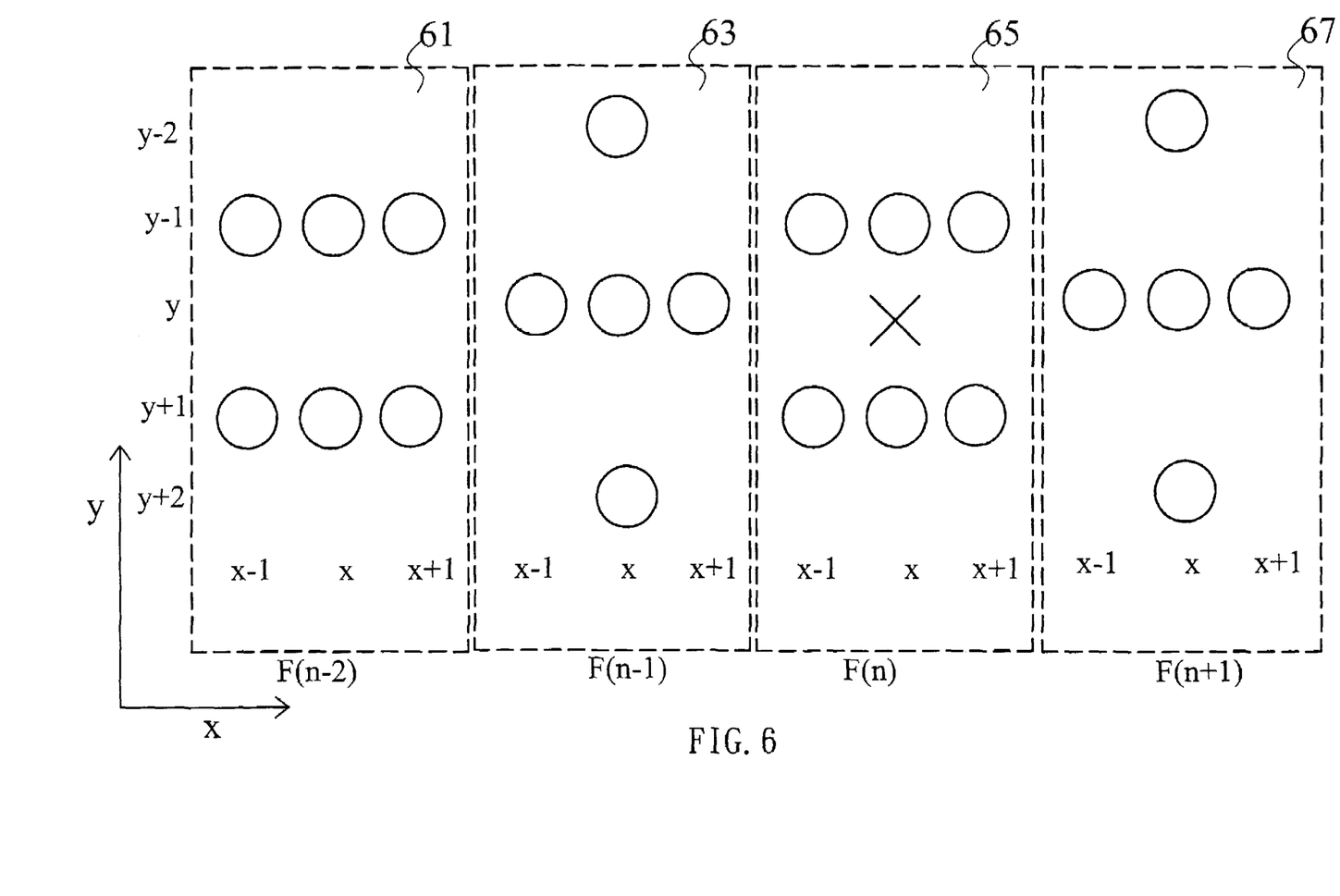
FIG. 6 is a schematic diagram showing a method for calculating the region difference in accordance with another preferred embodiment of the present invention.

To improve the accuracy, the region difference calculation for both top and bottom fields exploits four video fields, giving a more robustness static region evaluation. Please refer to FIG. 6, which is a schematic diagram showing a method for calculating the region difference in another embodiment of the present invention. As shown in FIG. 6, the four fields are the first field F(n−2) 61, the second field F(n−1) 63, the third field F(n) 65 and the fourth field F(n+1) 67. Therefore, the field to be de-interlaced is F(n) 65 and the reference fields are F(n−2) 61, F(n−1) 63 and F(n+1) 67. More particularly, the third field F(n) 65 is the current field, the first field F(n−2) 61 is the one before the preceding field, the second field F(n−1) 63 is the preceding field, and the fourth field F(n+1) 67 is the next field. A first difference Diff1 is calculated using these pixel locations in the first field F(n−2) 61 and the third field F(n) 65, while a second difference Diff2 is calculated using these pixel locations in the second field F(n−1) 63 and the fourth field F(n+1) 67. Diff1 and Diff2 are respectively expressed as:

$$Diff1(x, y, n) = \sum_{(i,j) \in \Gamma 1} |f(i, j, n) - f(i, j, n-2)| \quad (EQ. 4)$$

$$Diff2(x, y, n) = \sum_{(i,j) \in \Gamma 2} |(i, j, n-1) - f(i, j, n+1)| \quad (EQ. 5)$$

where f(.) denotes pixels used for calculation and $\Gamma 1=\{(x-1,y-1),(x,y-1),(x+1,y-1),(x-1,y+1),\ (x,y+1),\ (x+1,y+1)\}$ $\Gamma 2=\{(x,y-2),(x,y),(x,y+2),(x-1,y),(x+1,y)\}$.

Figure 7:
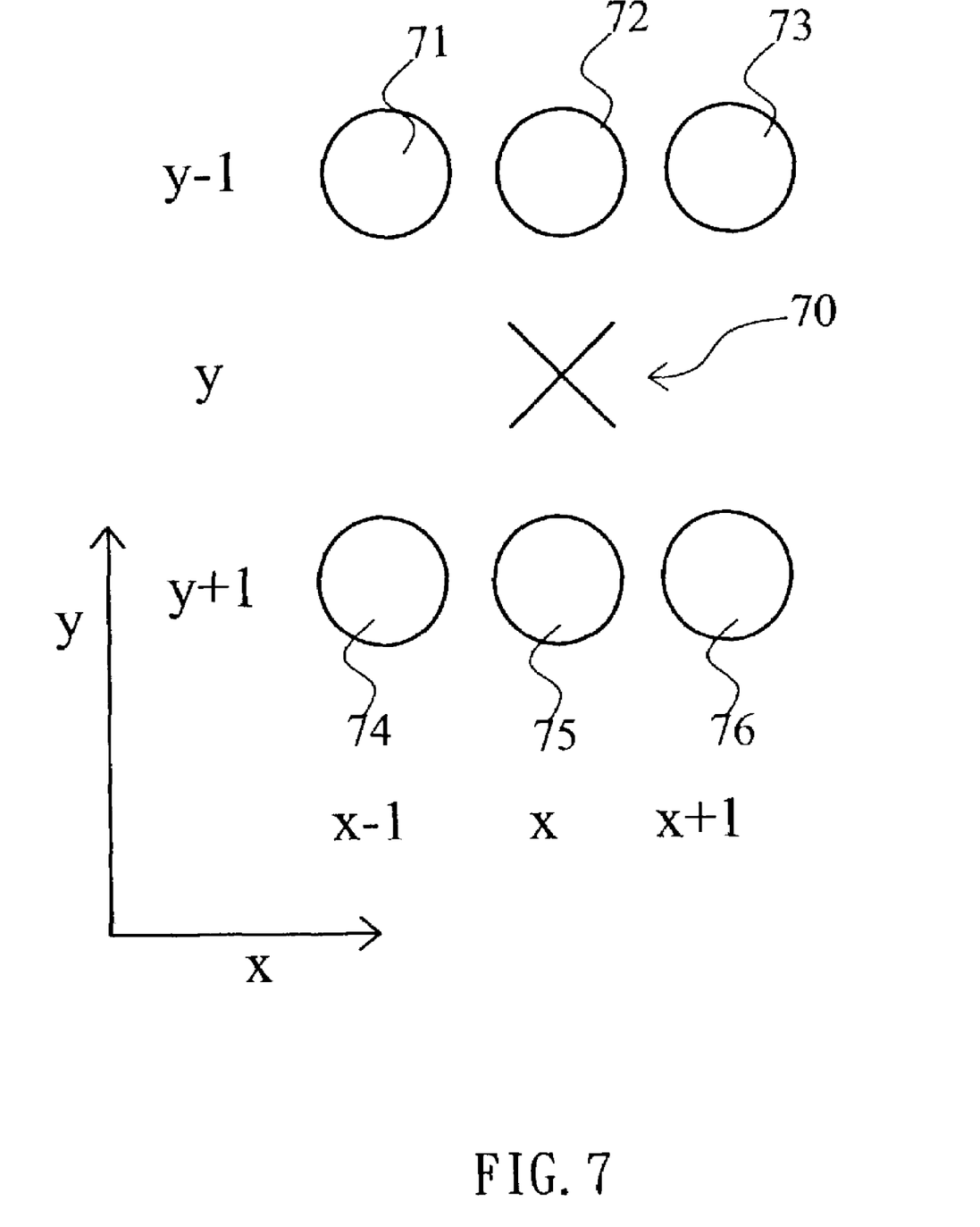
FIG. 7 is a schematic diagram showing an edge-oriented interpolation process in accordance with another preferred embodiment of the present invention.

FIG. 7 is a schematic diagram showing the edge-oriented intra-field interpolation in accordance with another preferred embodiment of the present invention. In edge-oriented intra-field interpolation, the value of the missing pixel "X" is interpolated with the neighboring pixel pair that has a minimum difference. In other words, the value of a reconstructed missing pixel is a mean value of two pixels of the same orientation that has a minimum difference. As shown in FIG. 7, the "X" symbol denotes a missing pixel 70 with neighboring pixels such as the first neighboring pixel 71, the second neighboring pixel 72, the third neighboring pixel 73, a fourth neighboring pixel 74, the fifth neighboring pixel 75 and the sixth neighboring pixel 76.

More particularly, the first difference U1 is the absolute difference between the first neighboring pixel 71 and the sixth neighboring pixel 76, the second difference U2 is the absolute difference between the second neighboring pixel 72 and the fifth neighboring pixel 75, and the third difference U3 is the absolute difference between the third neighboring pixel 73 and the fourth neighboring pixel 74. The missing pixel 70 is reconstructed according to the minimum difference. If U1 is the minimum difference, the value of the missing pixel is the mean of the value of the first neighboring pixel 71 and the value of the sixth neighboring pixel 76; if U2 is the minimum difference, the value of the missing pixel is the mean of the value of the second neighboring pixel 72 and the value of the fifth neighboring pixel 75; and if U3 is the minimum difference, the value of the missing pixel is the mean value of the value of the third neighboring pixel 73 and the value of the fourth neighboring pixel 74. Moreover, a median filtering process is employed to obtain a reconstructed value of the missing pixel 70. The median filtering process is used to limit he reconstruction error. In the present embodiment, a median value of the value obtained from the intra-field interpolation, the value of the second neighboring pixel 72 and the value of the fifth neighboring pixel 75 is obtained to reconstruct the value of the missing pixel 'X' 70.

Figure 8:
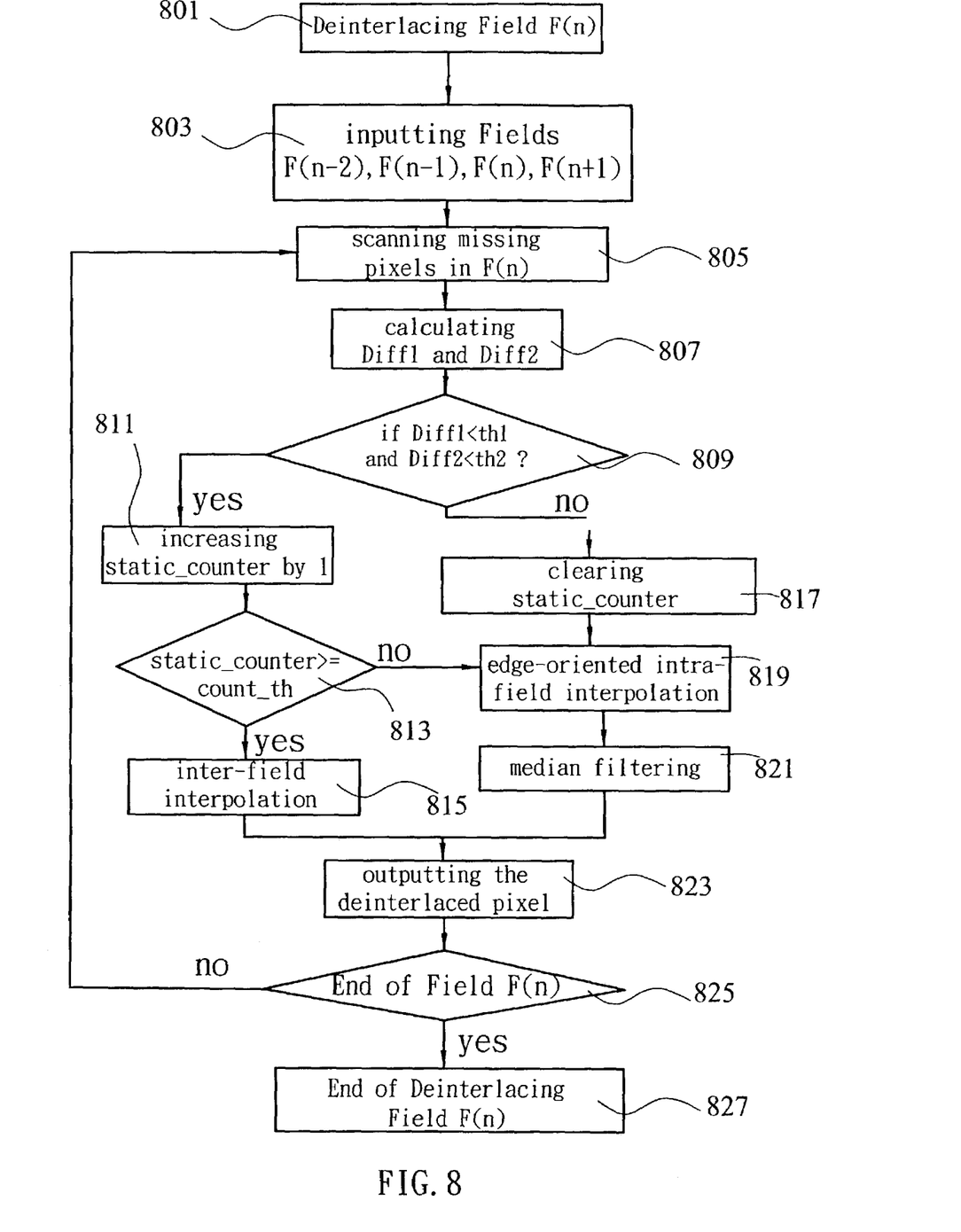
FIG. 8 is a flow chart showing a motion-adaptive de-interlacing algorithm with a static counter map in accordance with another preferred embodiment of the present invention.

FIG. 8 is a flow chart showing a motion-adaptive de-interlacing algorithm with a static counter map in accordance with another preferred embodiment of the present invention. In the present embodiment, a first difference Diff1 and a second difference Diff2 are obtained according to the difference among fields as shown in FIG. 6. Also, two corresponding thresholds are provided to evaluate the missing pixel is in a static region or a non-static region. As shown in FIG. 8, the field F(n) is to be de-interlaced (step 801). A de-interlacing processor inputs the video field to be de-interlaced and three other reference fields, including the third field F(n) 65, the first field F(n−2) 61, the second field F(n−1) 63 and the fourth field F(n+1) 67 (step 803). After that, the missing pixels in the field F(n) are scanned and interpolated in the raster order, from top-left to bottom-right (step 805). For a missing pixel, to calculate first difference among pixels neighboring each of the missing pixels in said field and the reference field of the same parity as the field and to calculate second difference among pixels neighboring each of the missing pixels in other two reference fields of the opposite parity said field, that is a first difference Diff1 and a second difference Diff1 are calculated (step 807) according to the methods respectively presented in (EQ.4) and (EQ.5) and are shown in FIG. 6. The first difference Diff1 is calculated based on the first field F(n−2) 61 and the third field F(n) 65; while the second difference Diff2 is calculated based on the second field F(n−1) 63 and the fourth field F(n+1) 67. Later, two corresponding thresholds th1 and th2 are provided.

The calculated differences Diff1 and Diff2 are then compared to the corresponding thresholds th1 and th2 (step 809) so as to evaluate whether the missing pixel is in a static region or in a non-static region. If the first differences Diff1 is smaller than the first threshold th1 and the second differences Diff2 is smaller than the second threshold th2, the region where the missing pixel locates is a static region, and therefore a static counter value static_counter is increased by 1 (step 811). The static counter value static_counter is then compared with a pre-determined count threshold count_th (step 813). If the static counter value static_counter is smaller than the count threshold count_th, the missing pixel is reconstructed using an edge-oriented intra-field interpolation process (step 819) according to FIG. 7. On the other hand, if the static counter value static_counter is larger than or equal to the count threshold count_th, the missing pixel is reconstructed using an inter-field interpolation process (step 815).

However, if the first difference Diff1 is larger than or equal to the first threshold th1 or the second difference Diff2 is larger than or equal to the second threshold th2, the region where the missing pixel locates contains motion, and therefore the static counter value static_counter is cleared to zero (step 817) and the missing pixel is reconstructed using the edge-oriented intra-field interpolation process (step 819) according to FIG. 7.

Then, a median filtering process is employed (step 821) to obtain a reconstructed de-interlaced pixel. After that, the reconstructed de-interlaced pixel is output (step 823) and whether the end of field F(n) is reached is evaluated (step 825). If yes, the field F(n) is stopped being de-interlaced (step 827); otherwise, the procedure returns to step 805 and these static region detection and interpolation processes repeat until all the missing pixels in the field F(n) have been reconstructed.

According to the above discussion, the present invention discloses a method for motion pixel detection with a static counter map so as to correctly evaluate whether a missing pixel is in a static region or a non-static region, thereby reconstructing the missing pixel by an inter-field interpolation process or an intra-field interpolation process, respectively. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for motion pixel detection, included in a method for reconstructing missing pixels in an interlaced video field, said reconstructing method comprising steps of:
   inputting said interlaced video field and a plurality of reference fields;
   scanning said missing pixels in a raster order;
   calculating a difference among pixels neighboring each of said missing pixels;
   comparing each difference with a threshold;
   modifying the value of each a static counter at the spatial position in said static counter map corresponding to each said missing pixel according to the difference comparison result;
   reconstructing each of said missing pixels by using an inter-field interpolation process and an intra-field interpolation process according to the value of said corresponding static counter;
   outputting reconstructed said missing pixels to the interlaced video field; and
   evaluating whether the scanning and reconstructing processes having reached the end of said interlaced video field.

2. The method for motion pixel detection as recited in claim 1, wherein said missing pixels are those pixels discarded in frame-to-field conversion for said video field being de-interlaced.

3. The method for motion pixel detection as recited in claim 1, wherein said reference fields are a preceding field prior to said interlaced video field and a next field posterior to said interlaced video field.

4. The method for motion pixel detection as recited in claim 1, wherein said difference is the sum of absolute difference of neighboring pixels in a preceding field and a next field.

5. The method for motion pixel detection as recited in claim 1, wherein the value of said static counter is increased by 1 if said difference is smaller than said threshold, otherwise, the value of said static counter is cleared to zero if said difference is larger than or equal to said threshold.

6. The method for motion pixel detection as recited in claim 5, wherein said intra-field interpolation process is used to reconstruct each of said missing pixels by averaging a value of a first pixel and a value of a second pixel.

7. The method for motion pixel detection as recited in claim 1, wherein the inter-field interpolation process is used to reconstruct each of said missing pixels if said corresponding static counter value is larger than or equal to a count threshold, and the intra-field interpolation process is used to reconstruct each of said missing pixels if said corresponding static counter value is smaller than a count threshold.

8. The method for motion pixel detection as recited in claim 1, wherein said inter-field interpolation process is used to reconstruct each of said missing pixels by averaging a value of a preceding pixel and a value of a next pixel at the same spatial location.

9. A method for motion pixel detection, included in a method for reconstructing missing pixels in an interlaced video field, said reconstructing method comprising steps of:
   inputting said video field to be de-interlaced and a plurality of reference fields;
   scanning each of said missing pixels in a raster order;
   calculating first difference among pixels neighboring each of said missing pixels in said field and said reference field of the same parity as said field;
   calculating second difference among pixels neighboring each of said missing pixels in other reference fields of the opposite parity said field;
   comparing said differences with corresponding thresholds;
   modifying the value of each static counter at the spatial position in a static counter map corresponding to each said missing pixel according to the difference comparison;
   reconstructing each of said missing pixels by using an inter-field interpolation process and an intra-field interpolation process according to the value of said corresponding static counter; outputting reconstructed said missing pixels to the interlaced video field; and
   evaluating whether the scanning and reconstructing processes reach the end of said interlaced video field.

10. The method for motion pixel detection as recited in claim 9, wherein said missing pixels are those pixels discarded in frame-to-field conversion for said video field being de-interlaced.

11. The method for motion pixel detection as recited in claim 9, wherein said reference fields are two preceding fields prior to said video field and one next field posterior to said video field if said video field is a top-field.

12. The method for motion pixel detection as recited in claim 9, wherein said reference fields are one preceding field prior to said video field and two next fields posterior to said video field if said video field is a to bottom-field.

13. The method for motion pixel detection as recited in claim 9, wherein said difference is the sum of absolute difference of neighboring pixels in said video field of the same parity.

14. The method for motion pixel detection as recited in claim 9, wherein the value of said static counter is increased by 1 if both differences are smaller than their corresponding thresholds, otherwise, the value of said static counter is cleared to zero if one of said differences is larger than or equal to said corresponding threshold.

15. The method for motion pixel detection as recited in claim 9, wherein said inter-field interpolation process is used to reconstruct each of said missing pixels if said corresponding static counter value is larger than or equal to a count threshold and said intra-field interpolation process is used to reconstruct each of said missing pixels if said corresponding static counter value is smaller than a count threshold.

16. The method for motion pixel detection as recited in claim 15, wherein an edge-oriented intra-field interpolation process is used to reconstruct each of said missing pixels by averaging a pair of pixels in the same spatial orientation and having the minimum value difference and said missing pixel is centered at said pair of pixels.

17. The method for motion pixel detection as recited in claim 16, wherein after said edge-oriented intra-field interpolation process, a median filtering process is applied to limit the reconstruction error of said missing pixel.

18. The method for motion pixel detection as recited in claim 17, wherein said median filtering process is used to obtain a median value among the intra-field interpolated value and pixel values neighboring said missing pixel.

19. The method for motion pixel detection as recited in claim 9, wherein said inter-field interpolation process is used to reconstruct said missing pixel by averaging a value of a pixel in said preceding field and a value of a pixel in said next field at the same spatial location as said missing pixel.

* * * * *